United States Patent [19]

Fukuda

[11] Patent Number: 5,279,098
[45] Date of Patent: Jan. 18, 1994

[54] APPARATUS FOR AND METHOD OF TRANSVERSE SEALING FOR A FORM-FILL-SEAL PACKAGING MACHINE

[75] Inventor: Masao Fukuda, Shiga, Japan

[73] Assignee: Ishida Scales Mfg. Co., Ltd., Kyoto, Japan

[21] Appl. No.: 32,566

[22] Filed: Mar. 12, 1993

Related U.S. Application Data

[63] Continuation of Ser. No. 943,437, Sep. 10, 1992, abandoned, which is a continuation-in-part of Ser. No. 826,648, Jan. 21, 1992, abandoned, which is a continuation-in-part of Ser. No. 734,960, Jul. 24, 1991, abandoned.

[30] Foreign Application Priority Data

Jul. 31, 1990 [JP] Japan ................... 2-204615
Sep. 13, 1991 [JP] Japan ................... 3-263060

[51] Int. Cl.5 .................. B65B 51/30; B65B 9/12; B65B 9/20
[52] U.S. Cl. ................. 53/451; 53/479; 53/551; 53/552; 53/374.6
[58] Field of Search .......... 53/451, 551, 552, 554, 53/374.5, 374.6, 450, 550, 479; 156/436, 439, 526, 494, 583.1

[56] References Cited

U.S. PATENT DOCUMENTS

| | | | |
|---|---|---|---|
| 3,067,555 | 12/1962 | Newell et al. | 53/551 |
| 3,159,955 | 12/1964 | Thürlings | 53/551 |
| 3,478,485 | 11/1969 | Hechenleitner | 53/551 X |
| 4,199,919 | 4/1980 | Moscatelli | 53/552 |
| 4,265,074 | 5/1981 | Reuter et al. | 53/551 |
| 4,291,520 | 9/1981 | Prince et al. | 53/551 |
| 4,391,081 | 7/1983 | Kovacs . | |
| 4,506,488 | 3/1985 | Matt et al. | 53/55 |
| 4,512,136 | 4/1985 | Christine | 53/410 |
| 4,516,379 | 5/1985 | Iain | 53/552 X |
| 4,750,313 | 6/1988 | Kammler et al. | 53/552 X |
| 4,885,900 | 12/1989 | Lohr et al. | 53/551 |
| 4,947,618 | 8/1990 | Schneider et al. | 53/374.6 |
| 5,031,380 | 7/1991 | Ueda | 53/552 X |

FOREIGN PATENT DOCUMENTS

0226693 4/1986 European Pat. Off. .
2372728 11/1977 France .

*Primary Examiner*—Horace M. Culver
*Attorney, Agent, or Firm*—Heller, Ehrman, White & McAuliffe

[57] ABSTRACT

A horizontal sealer for a vertical pillow type form-fill-seal packaging machine has a pair of horizontally elongated heater assemblies which are supported such that they remain horizontal as they individually rotate around mutually parallel axes. The distance between these axes are varied as the heater assemblies rotate around them such that the heater assemblies have generally D-shaped trajectories as they horizontally seal a tubularly formed thermoplastic flexible film material to make a bag. Mechanisms are provided whereby the heating surfaces of the assemblies remain oriented in the same direction, the pressure applied to the film material can be controlled and the bag can be squeezed before the horizontal sealing such that articles being packaged will settle inside the bag. A similarly structured vertical sealer may be provided to a horizontal pillow type packaging machine.

20 Claims, 10 Drawing Sheets

APPARATUS FOR AND METHOD OF TRANSVERSE SEALING FOR A FORM-FILL-SEAL PACKAGING MACHINE

This is a continuation of application Ser. No. 07/943,437 filed Sep. 10, 1992, now abandoned, which is a continuation-in-part of application Ser. No. 07/826,648 filed Jan. 21, 1992, now abandoned, which is a continuation-in-part of application Ser. No. 07/734,960 filed Jul. 24, 1991, now abandoned.

BACKGROUND OF THE INVENTION

This invention relates to an apparatus for driving the transversely sealing means of a form-fill-seal packaging machine for forming bags out of an elongated flexible thermoplastic film material by heating it in a direction transverse to its elongation. Form-fill-seal packaging machines of both vertical and horizontal pillow types have been known, and such sealing means are herein referred to summarily as a transverse sealer. It may be called a horizontal heater in the case of a packaging machine of the vertical pillow type, and a vertical heater in the case of a packaging machine of the horizontal pillow type.

Packaging machines of the form-fill-seal type and, in particular, of the so-called vertical pillow type are usually comprised of a shoulder-shaped member disposed above a vertical cylinder which is sometimes referred to as a loading cylinder. A web of belt-like elongated thermoplastic flexible film material, from which bags are to be made, is pulled out from a film supply roll and is wrapped around the loading cylinder by means of the shoulder-shaped member. For this reason, this shoulder-shaped member is sometimes referred to as a former. The side edges of the elongated film material are overlapped and these overlapped parts are thermally sealed as the film material is pulled down along the outer surface of the cylinder such that the film material is made into a tubular form. This sealing process is hereinafter referred to as the vertical sealing. A horizontally elongated heater is provided below the cylinder for a horizontal sealing process whereby the film material now in a tubular form is sealed horizontally into a bag-like form. In the meantime, articles to be packaged are dropped into this newly formed bag through the loading cylinder. Thus structured, packaging machines of the vertical pillow type are considered efficient because the production and filling of the bags can be carried out continuously and concurrently.

The aforementioned horizontal heater for horizontal sealing will be hereinafter referred to as a horizontal sealer and is generally comprised of a pair of horizontally elongated heating means, hereinafter referred to as seal jaws, which are pressed against each other from opposite sides of the tubular thermoplastic material to thereby make a horizontal seal. The methods of horizontal sealing may be broadly divided into the following two categories, the intermittent motion type and the continuous motion type. By a method of the intermittent motion type, the tubular film material to be horizontally sealed is pulled down in an intermittent stop-and-go manner and the seal jaws are moved towards each other and compress the film material therebetween from both sides while the downward motion of the film material is temporarily stopped. By a method of the continuous motion type, by contrast, the film material now in a tubular form is pulled down in a uniformly continuous motion and, in order to secure a finite sealing time, the sealing jaws are caused to also move in a downward direction together with the downward-moving film material. The present invention relates to a driving apparatus of the continuous motion type.

Many driving apparatus for a horizontal sealer have been considered. If the seal jaws are made to undergo circular motions in a vertical plane, they can make only a point contact with each other at the point where the two circular orbits are tangent to each other. In addition, the sealed surface becomes curved, rather than flat. Japanese Patent Publication Tokkai 62-235006 disclosed a driving apparatus for causing seal jaws to move linearly along the downward path of the film material such that the entire heating surfaces of the seal jaws can remain in contact with the film material for a finite duration of time. As means for providing such a linear motion to the seal jaws, however, generally D-shaped grooves were used to guide the seal jaws supported at end sections of rotary members. If the rotational motion of these rotary members is increased, to reduce the time required for sealing, for example, the force of inertia by the rotary members increases accordingly and an abnormal force tends to develop on the seal jaws where the grooves change their directions. Another disadvantage of this apparatus is that the trajectory of the seal jaws is invariably determined by the guiding grooves. Depending upon the type of the articles to be packaged, it may be desirable to modify the trajectory so as, for example, to be able to give the bag a squeeze in the vertical direction to cause its contents to settle.

In still another aspect of the present invention, it is desirable to be able to adjust the pressure with which the seal jaws are pressed against each other for carrying out the horizontal sealing process. Prior art attempts to make use of a spring for this purpose have not been satisfactory because this tends to increase vibrations especially if the seal jaws are opened and closed at a fast rate. If a motor dedicated to this task is introduced, this affects the overall cost of the system adversely. If use is made of devices including an oil or air pump, on the other hand, there arises the problem of piping and the pressure cannot easily be varied automatically.

The background of the present invention has been described above with reference only to a form-fill-seal packaging machine of the vertical pillow type, but the disadvantages of the kind described above are also experienced with prior art packaging machines of the horizontal pillow type.

Summary of the Invention

It is therefore an object of the present invention to provide an improved transverse sealing means with which the motion of seal jaws of a vertical or horizontal pillow type form-fill-seal packaging machine can be controlled easily and effectively.

It is another object of the invention to provide such means with which the sealing pressure between the seal jaws can be conveniently controlled.

It is still another object of the invention to provide such means for allowing the bag being formed to be squeezed before it is transversely sealed such that the articles being dropped in can settle within the bag.

The above and other objects of the present invention can be accomplished by a driving mechanism according to the present invention which may be characterized as having rotating means for moving a pair of heater assemblies in mutually opposite directions and each around one of a pair of mutually parallel axes on opposite sides of a traveling bag-forming film material such that these heater assemblies remain extended in the direction of these axes. In addition, means are provided for controllably varying the separation between these axes such that the heater assemblies press each other over a portion of the path of the traveling film material with a finite length while rotating around the axes. The mechanism is so designed that the heating surfaces of the heater assemblies remain oriented in a same direction throughout the rotary motions of the heater assemblies, and this may be accomplished by using a combination of a sun gear and a planet gear connected with an idler gear in between. The aforementioned means for moving the axes may include a pinion and a pair of rack gears, or alternatively a turnbuckle and axes-supporting frames. The bag being formed can be squeezed before it is sealed in order to cause its contents to settle either by properly operating the axes-moving means or by providing transversely extended bars which move with the heater assemblies.

DETAILED DESCRIPTION OF THE INVENTION

Figure 1:
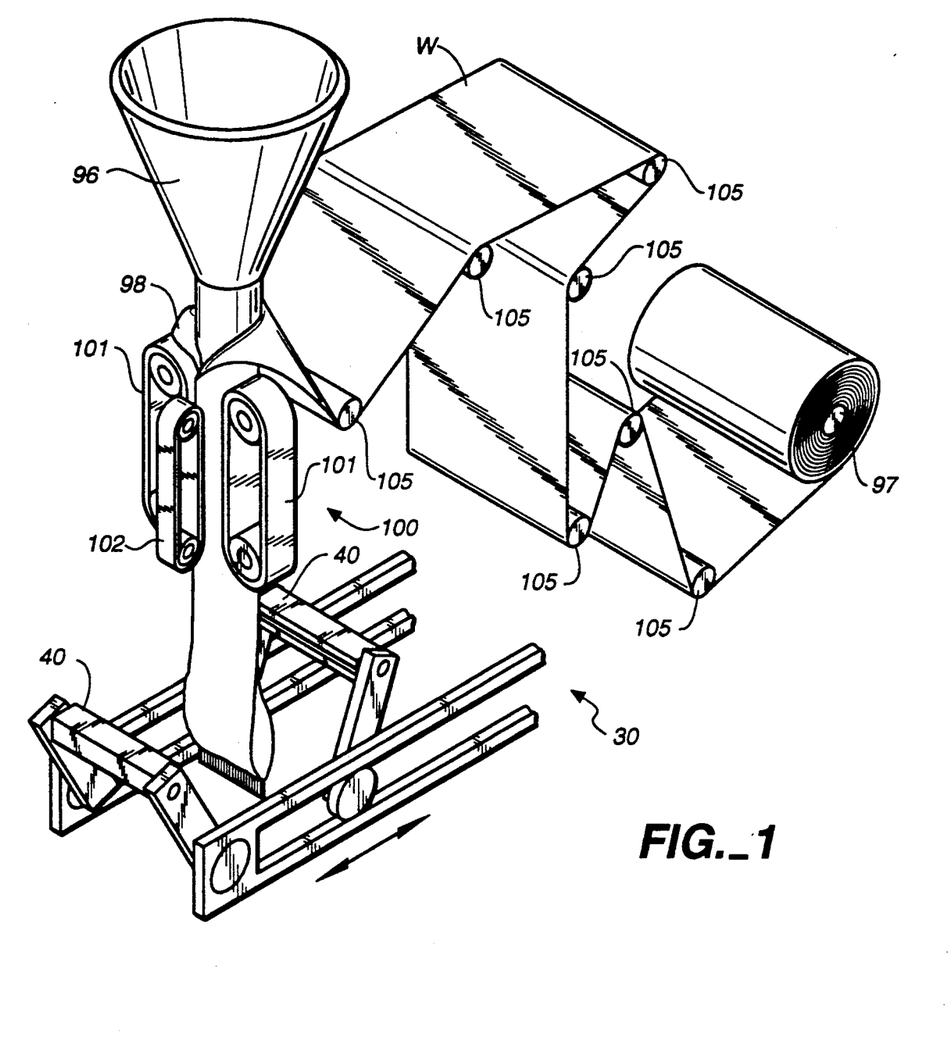
FIG. 1 is a schematic diagonal view of a part of a form-fill-seal packaging machine incorporating a horizontal sealer embodying the present invention, showing only some of its components relevant to the description of the invention.

For the purpose of reference, there is schematically shown in FIG. 1 a form-fill-seal packaging machine of the vertical pillow type which may incorporate the present invention. For convenience, FIG. 1 shows only relevant parts of such a machine related to its forming, filling and sealing operations. In FIG. 1, a web of flexible thermoplastic film material W is shown as unwinding from a film supply roll 97 and being guided by a plurality of guide rolls 105 to be directed to a shoulder-shaped former 98 of a known kind. After the film material W is formed into a tubular shape by the former 98, it is pulled vertically downward by a film-pulling apparatus 100 including a parallel-running pair of pull-down belts 101 and a heater belt 102 which serves to vertically seal the mutually overlapping edge portions of the film material W to thereby effect the vertical sealing process. The film material W, now in the form of a tube, is thereafter horizontally sealed by a horizontal sealer which is disposed below the film-pulling apparatus 100 and includes a pair of seal jaws 40 and a driving mechanism 30 therefor. As the film material W is horizontally sealed into a bag-like form, articles to be packaged are dropped from a hopper 96 above the former 98.

Figure 2:
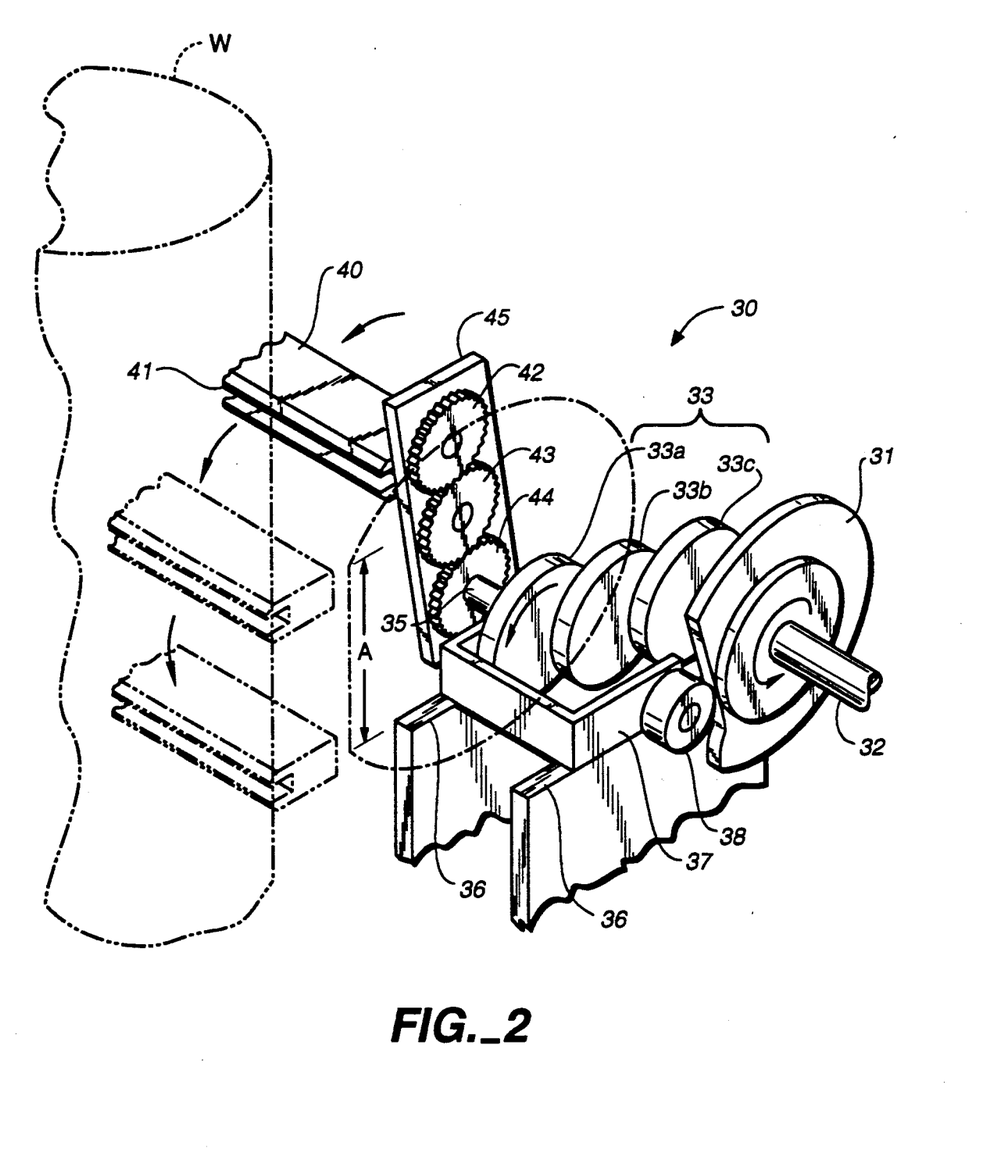
FIG. 2 is a schematic diagonal view of a porion of an apparatus according to the present invention for driving a seal jaw of a form-fill-seal packaging machine.
Figure 3:
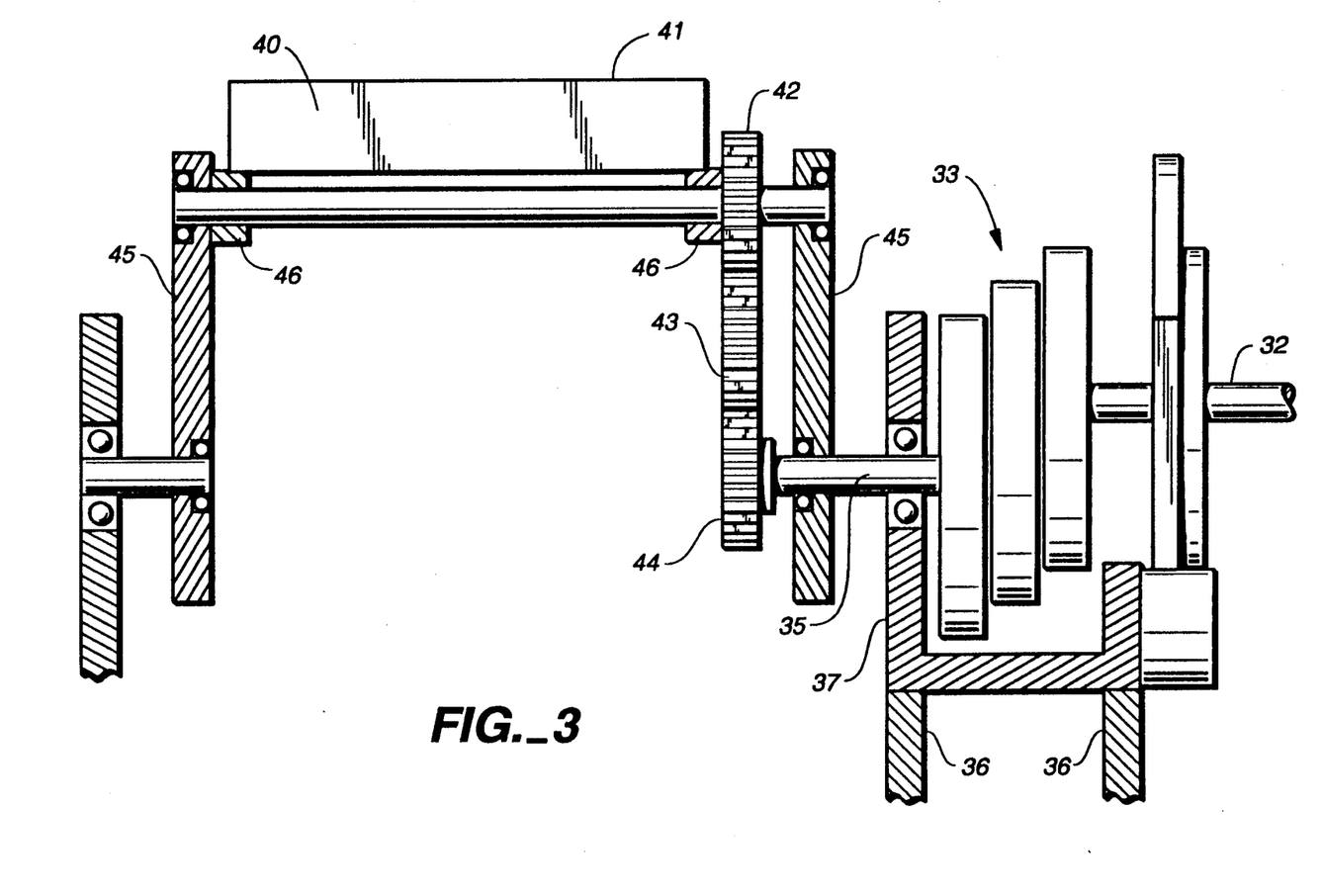
FIG. 3 is a schematic plan view of the apparatus of FIG. 2 when the arm-like frame is in horizontal position.

The structure and operations of the seal jaws 40 and their driving mechanism 30 will be described next with reference to FIGS. 2 and 3. Since the pair of seal jaws 40 are symmetrically disposed with reference to the tubular film material W to be sealed thereby, FIG. 2 shows only one of the pair.

The driving mechanism 30 includes a cam 31 rigidly mounted to a horizontal drive shaft 32 so as to rotate therearound and therewith. The seal jaw 40 is rotatably supported by an arm-like side frame 45 so as to maintain its horizontal position. The side frame 45 is unistructurally connected to a horizontal seal jaw axis 35 so as to rotate therearound and therewith. The drive shaft 32 and the axis 35 are parallel to each other and in a torque-communicating relationship with each other by means of a Schmidt coupling 33. The schmidt coupling 33 is a device comprising rotary disks and links therebetween for transmitting torque in a transverse direction. It is described, for example, in Japanese Patent Publication Kokoku 44-19486 published Aug. 23, 1969 (based on U.S. patent application Ser. No. 406,696 filed Oct. 27, 1964). It is therefore assumed known and will not be described in any detail herein. In FIG. 2, the schmidt coupling 33 is schematically drawn as a linked set of three disks 33a, 33b and 33c, the first of these disks (33a) being rigidly mounted to the drive shaft 32 and the third of these disks (33c) being rigidly mounted to the axis 35.

A bracket 37, which is adapted to slide on and along a horizontal guide surface 36, is attached to the seal jaw axis 35 through a bearing. A cam follower 38 which is adapted to remain engaged with the cam 31 is axially supported by this bracket 37 as shown in FIG. 2. The cam 31 is generally D-shaped such that the rotation of the cam 31 with the drive shaft 32 causes a horizontal lateral motion of the bracket 37 and hence of the axis 35,, thereby controlling the horizontal separation between the seal jaw 40 and the vertically downward path of the film material W.

As briefly explained above, the seal jaw 40 is supported by the arm-like side frame 45 in such a way that it remains oriented in the same direction, keeping its heating surface (indicated by 41) in vertical orientation, as the frame 45 turns around the axis 35. The mechanism by which the seal jaw 40 is supported in this manner includes a sun gear 44 which is coaxial with the seal jaw axis 35, an idler gear 43 which engages with the sun gear 44, and a planet gear 42 which is of the same diameter as the sun gear 44 and engages with the idler gear 43. The planet gear 42 is axially supported by the side frame 45 and is rigidly affixed to the seal jaw 40 through a supporting member 46.

With the mechanism thus structured, if the cam 31 is rotated by the motion of the drive shaft 32, the cam follower 38, which is adapted to remain in contact with the periphery of the cam 31, causes the bracket 37 and hence the axis 35 to move either towards or away from the vertical path of the film material W. At the same time, the rotary motion of the drive shaft 32 is communicated through the Schmidt coupling 33 to the seal jaw axis 35, thereby causing the side frame 45 to rotate around the axis 35. Since the sun gear 44 and the planet gear 42 are of the same diameter, the planet gear 12, while rotating with the side frame 45 around the axis 35, does not rotate around its own axis. Thus, the heating surface 41 of the seal jaw 40 remains vertical throughout the rotary motion of the seal jaw 40 around the axis 35 as schematically illustrated in FIG. 2. A generally D-shaped trajectory of the seal jaw 40 is illustrated in FIG. 2 by a dotted line. As mentioned above, the seal jaw 40 illustrated in FIGS. 2 and 3 is only one of a pair, the other being disposed and operated to move symmetrically. Thus, as the film material W in tubular form is pulled down at a constant rate, it is horizontally sealed by the pair of seal jaws 40 which are brought together from opposite sides and move downward at the same speed as the film material such that a sufficiently long sealing time can be secured. In FIG. 2, letter A represents the linear part of the generally D-shaped trajectory of the seal jaw 40 wherein the horizontal sealing is to take place.

Figure 4:
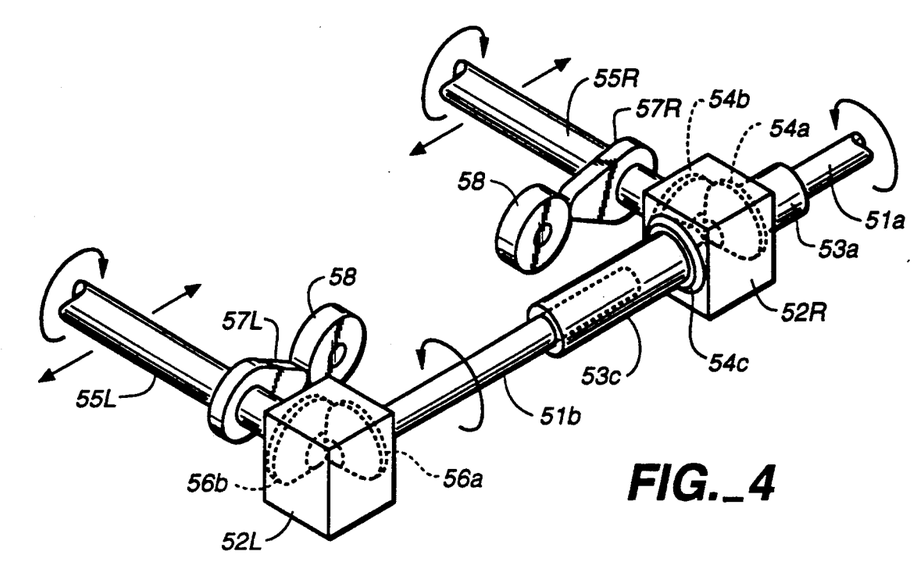
FIG. 4 is a schematic diagonal view of a portion of another apparatus according to the present invention for driving a pair of seal jaws of a form-fill-seal packaging machine.

FIG. 4 shows another embodiment of the present invention by means of which a pair of seal jaws (shown schematically at 56R and 56L in FIG. 5) can be caused to move in generally D-shaped trajectories. In FIG. 4, the seal jaw axes corresponding to the pair of seal jaws 56R and 56L in the way described in connection with FIGS. 2 and 3 are respectively shown at 55R and 55L. Numeral 51a indicates a (first) spline axis connected to a servo motor (not shown). A (first) gear box 52R contains three (first, second and third) bevel gears (shown respectively at 54a, 54b and 54c) such that the second bevel gear 54b engages with both the first and the third bevel gears 54a and 54c. A (first) sleeve shaft 53a unistructurally formed with the first bevel gear 54a engages with the spline axis 51a so as to be able both to cause the gear box 52R to slide longitudinally therealong and to itself rotate therewith. The second bevel gear 54b is connected to one of the seal jaw axes (55R) and the third bevel gear 54c is unistructurally formed with another (second) sleeve axis 53c which engages another (second) spline axis 51b such that the gear box 52R can slide also longitudinally along the second spline axis 51c and the rotation of the third bevel gear 54c can be communicated thereto. The other end of the second spline axis 51b distal from the first gear box 52R is connected to a first bevel gear 56a in another (second) gear box 52L which also contains a second bevel gear 56b which is unistructurally formed with the second seal jaw axis 55L and engages with the first bevel gear 56a.

Figure 5:
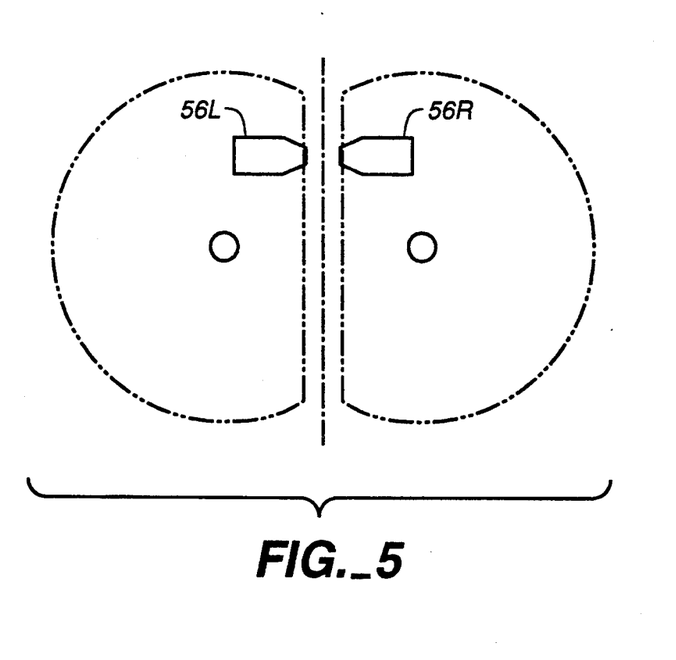
FIG. 5 is a horizontal view of the trajectories of the seal jaws operated by the driving apparatus of FIG. 4.

Cams 57R and 57L are mounted respectively to the first and second seal jaw axes 55R and 55L and in contact respectively to two cam followers 58 which are affixed to a frame. These cams 57R and 57L are so shaped that the seal jaw axes 55R and 55L, as they are rotated, move towards or away from each other such that the seal jaws 56R and 56L are moved in generally D-shaped trajectories as shown in FIG. 5 in the same manner as described above in connection with FIGS. 2 and 3.

It should now be noted in this connection that the seal jaws 56R and 56L can be made to follow modified trajectories simply by replacing the cams 57R and 57L by others with a different shape. When the bags are being filled with articles with a low volume density such as potato chips, for example, it is preferable to "squeeze" the film material W prior to the horizontal sealing process so that the articles being loaded will not be present where the sealing takes place. This can be accomplished by exchanging the set of cams (31 of FIG. 2 and 57 of FIG. 4) by another with an appropriate shape.

Figure 6:
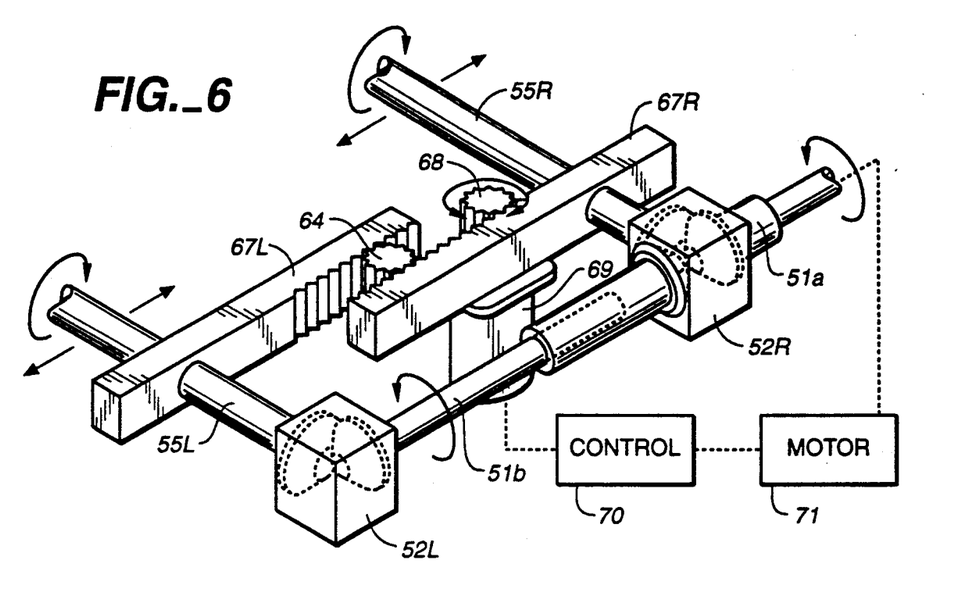
FIG. 6 is a schematic diagonal view of a portion of still another apparatus according to the present invention for controlling the motion of the seal jaws of a form-fill-seal packaging machine.

FIG. 6 shows still another embodiment of the present invention for simultaneously carrying out both the horizontal sealing and the "squeezing" of the kind mentioned above. In FIG. 6, the components which are substantially the same as those already shown in FIG. 4 and explained above are denoted by the same numerals and will not be explained again. The embodiment shown in FIG. 6 is characterized as having a pinion 64 and two rack gears 67R and 67L which both engage with the pinion 64 and through which the two seal jaw axes 55R and 55L are mutually connected. Moreover, one of the rack gears (67R in FIG. 6) engages with another pinion 68 connected with an axes-moving servo motor 69 such that the seal jaw axes 55R and 55L can be moved toward or away from each other according to the operation of this servo motor 69 provided independently of the jaw-rotating servo motor (schematically shown at 71) connected to the first spline axis 51a.

Figure 7:
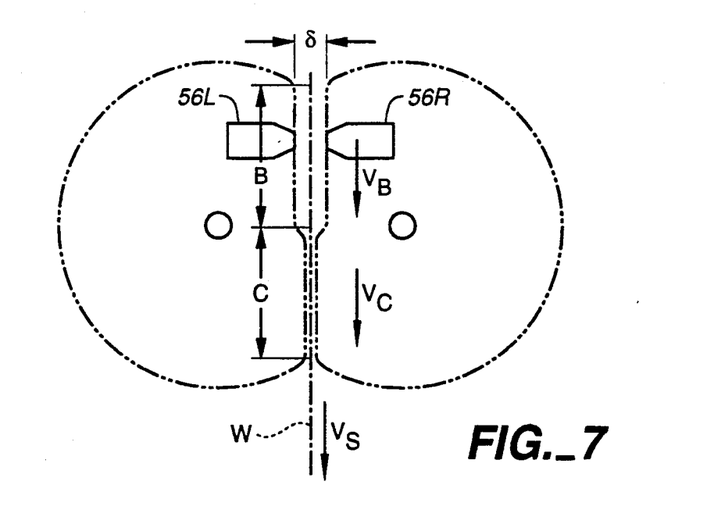
FIG. 7 is a horizontal view of the trajectories of the seal jaws operated by the driving apparatus of FIG. 6.

According to one embodiment of the invention, the axes-moving servo motor 69 is programmed to rotate in positive and negative directions in synchronism with the jaw-rotating servo motor 71 such that the trajectories of the seal jaws 56R and 56L will look as shown in FIG. 7, having on the upstream side of the linear trajectory part A a "squeezing region" B wherein the seal jaws 56R and 56B are separated by a predetermined small distance δ and on the downstream side of the linear trajectory part A a horizontal sealing region C wherein the two seal jaws 56R and 56L are brought mutually closer together.

According to a more preferred embodiment, the rotational speed of the jaw-rotating servo motor 71 is controlled such that the linear speed $V_B$ of the seal jaws 56R and 56B in the "squeezing region" B will be greater than the downward transfer speed $V_S$ of the film material W and that the linear speed $V_C$ of the seal jaws 56R and 56L in the horizontal sealing region C will be equal to $V_S$. In FIG. 6, a control device for controlling the axes-moving and jaw-rotating servo motors 69 and 71 of FIG. 6 independently and synchronously is shown schematically at 70.

Figure 8:
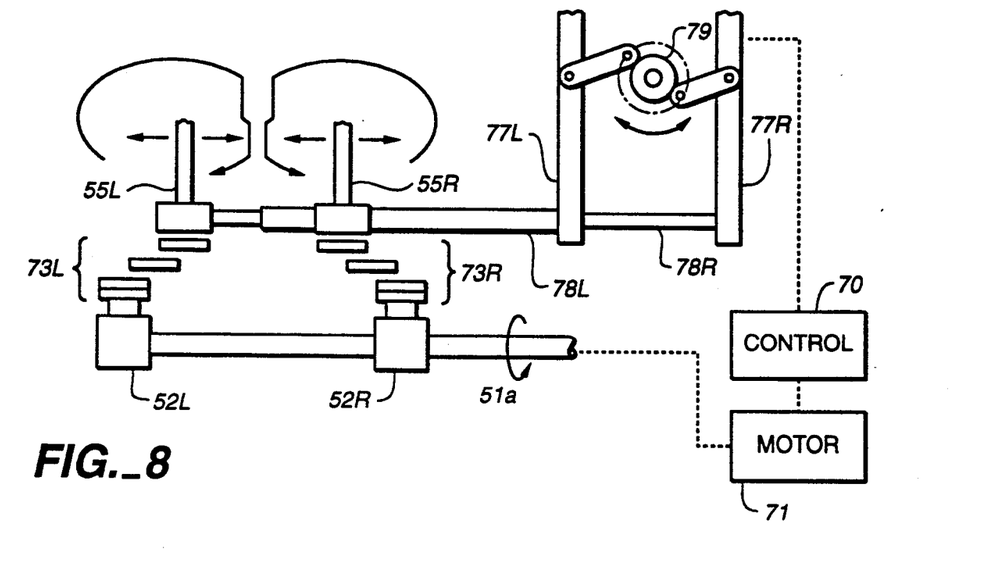
FIG. 8 is a schematic of still another apparatus according to the present invention for controlling the motion of the seal jaws of a form-fill-seal packaging machine.

FIG. 8, using the same numerals again to indicate the comparable components described above and shown in FIG. 4 and/or FIG. 6, shows still another embodiment of the invention different from the one shown above in FIG. 6 in that schmidt couplings 73R and 74L are used to transmit torque from the gear boxes 52R and 52L to the seal jaw axes 55R and 55L. An axes-moving servo motor 79 is connected to a pair of arms 77R and 77L, instead of the pinions 64 and 68 and the rack gears 67R and 67L shown in FIG. 6, such that the separation between the two arms 77R and 77L can be controllably increased or decreased and this change in the separation between the arms 77R and 77L is directly communicated through mutually coaxial rods 78R and 78L to the seal jaw axes 55R and 55L. In this example, too, the seal jaws can be caused to travel on generally D-shaped trajectories with a squeezing region and a horizontal sealing region by operating the axes-moving servo motor 79 and a jaw-rotating servo motor only schematically shown as being connected to the spline axis 51a and indicated again by numeral 71 in an appropriately coordinated manner. A control device for controlling the axes-moving and jaw-rotating servo motors 79 and 71 of FIG. 8 independently and in such a coordinated manner is schematically shown and again indicated by numeral 70 as in FIG. 6.

In summary, the apparatus for driving the seal jaws according to the present invention are characterized as having a pair of seal jaw axes which rotate in mutually opposite directions and a mechanism for controllably increasing and decreasing the distance between these axes. The apparatus shown in FIG. 2 is characteristic in that a single motor means serves both to rotate the seal jaw axis and to shift the position of the seal jaw axis laterally. The apparatus shown in FIGS. 6 and 8 are characteristic in that two independent motor means are used for these two kinds of motion such that more complicated trajectories and squeezing are possible.

Figure 9:
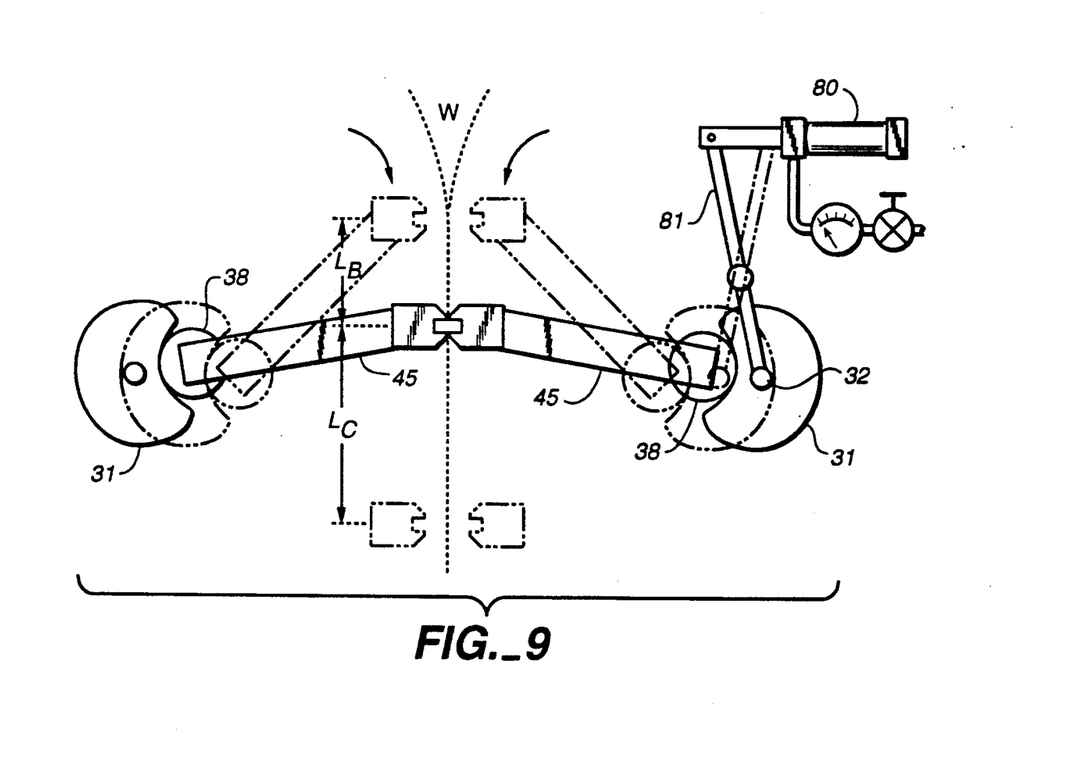
FIG. 9 is a schematic showing the use of an air cylinder to adjust the sealing pressure between the seal jaws according to the invention.

The examples described above are intended to be merely illustrative of the invention and not to place any limitations on its scope. Many variations and modifications are possible on the examples illustrated above within the scope of the invention. For example, a device for controlling the sealing pressure (that is, the pressure with which the pair of mutually opposite seal jaws 40 presses the film material from both sides to make the horizontal seal) may be incorporated. One method of accomplishing this purpose would be to attach one end of a rotatably supported lever 81 as shown schematically in FIG. 9, to the drive shaft 32 of the cam 31 in the apparatus described above with reference to FIG. 2. The other end of the lever 81 is connected to an air cylinder 80 such that the drive shaft 32 of the cam 31 can be moved horizontally towards the other cam of the pair on the opposite side of the film material W.

A general mechanism has already been described above for causing the seal jaws 40 to execute D-shaped trajectories as shown in FIG. 7 with a "squeezing region" (of linear distance $L_B$ and a horizontal sealing region (of linear distance $L_C$) has been explained already. When the seal jaws 40 are moving within the squeezing region (at speed $V_B$ greater than the film speed $V_S$ as explained above), the air cylinder 80 is not actuated yet and a small distance is maintained between the seal jaws 40 for the squeezing action to cause the articles inside the bag to settle. At the end of the squeezing region, the downward speed of the seal jaws 40 is reduced to $V_C$ equal to $V_S$ and the air cylinder 80 is actuated so as to shift the position of the drive shaft 32 of the cam 31 and to thereby cause the seal jaws 40 to compress each other. The compressive force between the seal jaws can be adjusted by controlling the air pressure. The time for squeezing $t_B$, the squeezed distance L on the film material and the time for sealing $t_C$ can be controlled according to the following formulas:

$$t_B = L_B/V_B;$$

$$L = L_B\{1 - V_S/V_B\}; \text{ and}$$

$$t_C = L_C/V_S.$$

In cases where an axes-moving servo motor or the like is used for adjusting the distance separating the two seal jaw axes as shown, for example, in FIG. 6, the sealing pressure can be controlled by adjusting the torque of the motor.

Figure 10:
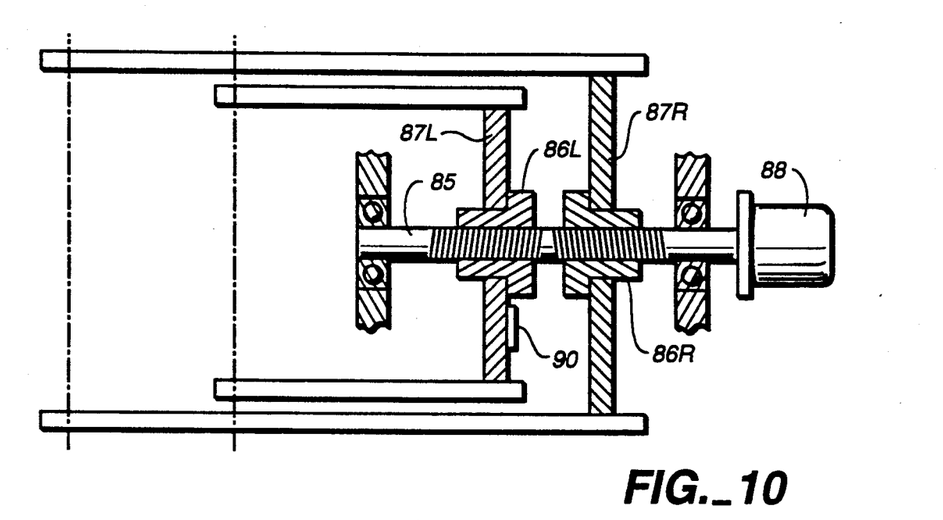
FIG. 10 is a schematic showing the use of a turnbuckle and nuts according to the invention to adjust the sealing pressure between the seal jaws.

Another method of controlling the sealing pressure between seal jaws in a horizontal sealing process is illustrated in FIG. 10 where a turnbuckle 85 with right-handed and left-handed screw sections provided thereon serves the purpose of the rack gears 67R and 67L of FIG. 6. Nuts 86R and 86L engage respectively with these right-handed and left-handed screw sections of the turnbuckle 85 such that the separation therebetween tends to increase or decrease, depending on the direction in which the turnbuckle 85 is rotated by means of a motor 88. In FIG. 10, numerals 87R and 87L respectively indicate a cross frame (not shown in FIG. 3) connecting the side frames 45 on both sides of the seal jaw and the two parallel dotted lines indicate the positions of the seal jaw axes.

As the jaw-rotating motor (not shown) is rotated and the seal jaws are on the circular parts of their generally D-shaped trajectories, the motor 88 serves mainly as an axes-moving motor. When the seal jaws are on the linear parts of their trajectories, the operation of this axes-moving motor 88 is controlled by its torque. On the top halves of the linear parts of the generally D-shaped trajectories, the motor 88 rotates so as to push the nuts 86R and 86L to move away from each other. Since the motor 88 is now being operated in a torque-controlling mode, however, it has a braking effect on the nuts 86R and 86L, thereby generating a compressive force between the seal jaws. When the seal jaws are on the bottom halves of the linear parts of the trajectories, the direction of rotation of the motor 88 is reversed. As a result, the nuts 86R and 86L tend to move towards each other, thereby generating a compressive force between the seal jaws. In summary, the sealing pressure can be adjusted to any level without any additional equipment. The right-hand and left-hand screw parts of the turnbuckle 85 are preferably so designed that the cross frames 87R and 87L can be manually pushed apart easily when it is desired, for example, to adjust the position of the film material while the motor 88 is not running.

A load cell 90 may be attached to one of the cross frames (87L in FIG. 10). The sealing pressure developed between the seal jaws 56R and 56L is transmitted through the side frames 45 to the cross frame 87L, tending to bend it. The strain thus generated is detectable by this load cell 90 and the sealing pressure at this moment can be calculated from this detected magnitude of the strain.

Figure 11A:
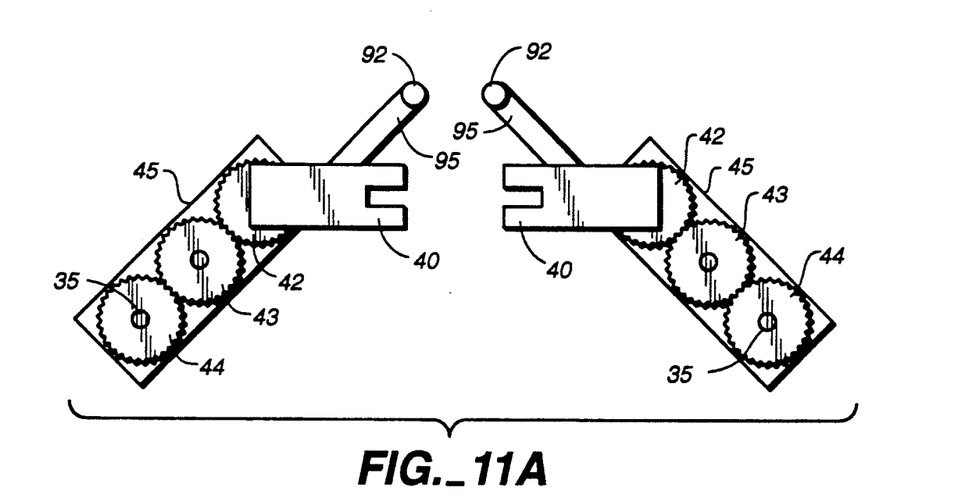
FIGS. 11A and 11B are schematic horizontal views of a simple device attached to the side frames of the seal jaws for squeezing the film material.
Figure 11B:
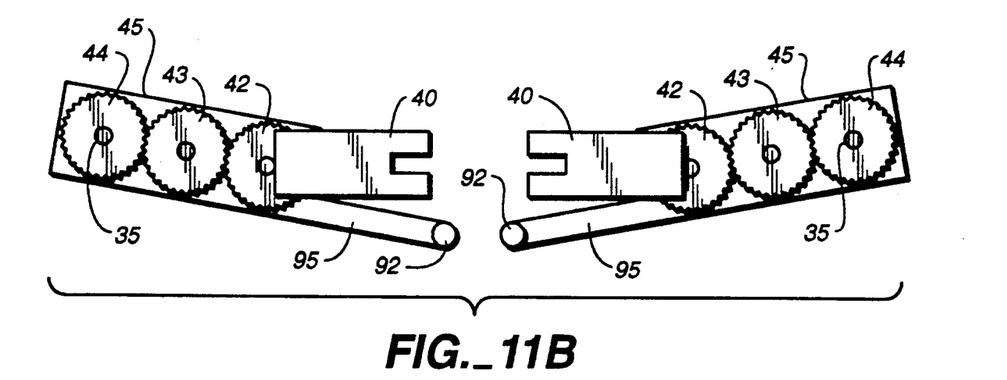

A much simpler device with which the squeezing operation can be effected is described next with reference to FIGS. 11A and 11B where the components which are comparable to those already explained above are again indicated by the same numerals. This device is characterized as having elongated squeezing bars 92 (shown only sectionally in FIGS. 11A and 11B) each supported by members 95 protruding from one of the side frames 45 radially away from the seal jaw axis 35. When the seal jaws 40 are about to start on the linear part of their generally D-shaped trajectories, the distal ends of these projecting members 95 away from the side frames 45 and hence the squeezing bard 92 are above the seal jaws 40 as shown in FIG. 11A because, as explained above, the seal jaws 40 are adapted to always keep their horizontal positions (say, by means of the sun gears 44, the idlers 43 and the planet gears 42 as explained above with reference to FIG. 2). When the seal jaws are at about the same height as the seal jaw axes 35, however, these projecting members 95 as well as the squeezing bars 92 are below the seal jaws 40 as shown in FIG. 11B because they are affixed to the respective seal jaws. It can be understood by a comparison between FIGS. 11A and 11B that these squeezing bars 92 travel a longer vertical distance than the seal jaws 40 between these two points in time. In other words, if the seal jaws 40 are caused to move at the same speed as the film material W, the squeezing bars 92 move faster than the film material and this has the desired squeezing effect on the film material.

A still another transverse sealer embodying the present invention is described next with reference to FIGS. 12 and 13 as applied to a form-fill-seal packaging machine of the type without requiring the use of a so-called filling cylinder to form a bag. Such a packaging machine makes use of a pair of pull-down belts 203 below a former 202 each provided with a suction chamber 204 for providing a negative pressure such that an incoming film material W is formed into and maintained in a cylindrical shape. While the external surface of the cylindrically formed film material W is pulled in the outward direction by the negative pressure from the suction chambers 204, mutually overlapping side edges of the film material W are sealed together by a vertical seal jaw 205 into a tubular form. Numeral 201 indicates a hopper from which articles to be packaged are dropped.

The film material W, now in tubular form, is further pulled down to be transversely sealed by a horizontal sealer 210 so as to be made into individual bags. The horizontal sealer 210, according to still another embodiment of the present invention, is comprised of a pair of transverse seal jaws 221, rotary arm assemblies 211 for causing these seal jaws 221 to rotate while always facing in the same directions towards each other, squeezing members 227 at distal ends of these rotary arm assemblies 211, and pairs of left-hand and right-hand mobile outer frames 230 and inner frames 234 which are so assembled that proximal end parts of the rotary arm assemblies 211 can be moved towards or away from each other to thereby cause the transverse seal jaws 221 and the squeezing members 227 to move in generally D-shaped rotational trajectories. For this purpose, the left-hand and right-hand mobile outer frames 230 are connected to each other by a transversely extending connector plate 331, the pair of left-hand and right-hand mobile inner frames 234 are similarly connected to each other by another transversely extending connector plate 334, and both the pair of mobile outer frames 230 and that of mobile inner frames 234 can move in the forward-backward direction, the outer frames 230 sliding on the housing frame 246 of the apparatus and the inner frames 234 sliding inside and against the outer frames 230. This manner of assembling the frames 230 and 234 for supporting the rotary arm assemblies 211 is advantageous in that they can provide improved rigidity and resistance against torque experienced thereby.

Figure 13:
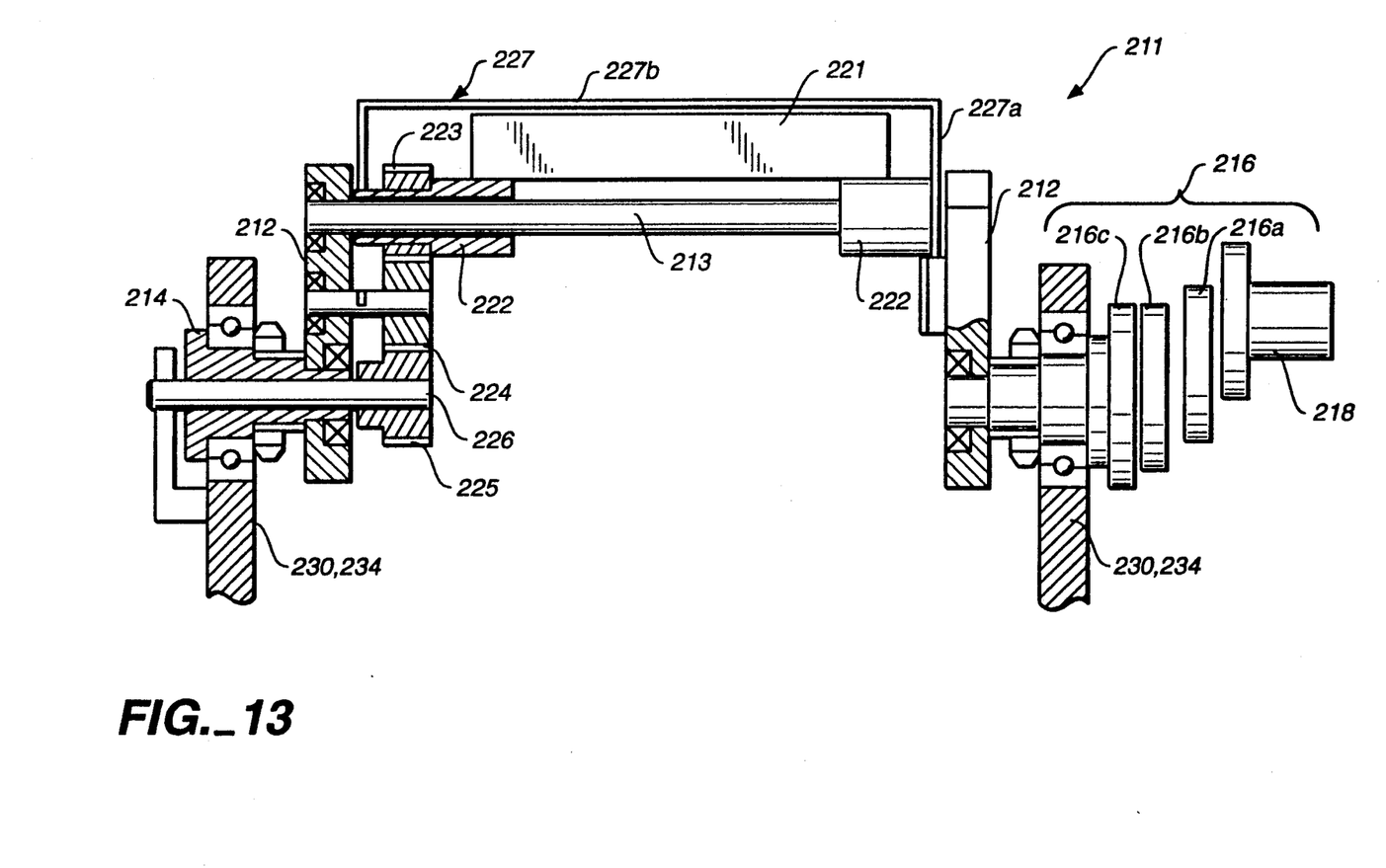
FIG. 13 is a sectional view of one of the rotary arm assemblies of the horizontal sealer of FIG. 12.

As shown more clearly in FIG. 13, which is a sectional view of one of the rotary arm assemblies 211, each rotary arm assembly 211 is solidly built as three quarters of a unistructurally formed rectangular frame with a pair of right-hand and left-hand (with reference to FIG. 13) arm pieces 212 and a connecting shaft 213. The left-hand arm piece 212 is rotatably supported by a supporting shaft 214 which protrudes inwardly from left-hand the mobile outer frame 230, and the right-hand arm piece 212 is affixed to an input shaft 215 which is collinear with the supporting shaft 214 and protrudes inwardly from the left-hand mobile inner frame 234 such that the rigidly formed arm assembly 211 can rotate around both the supporting shaft 214 and the input shaft 215.

Numeral 216 indicates a Schmidt coupling with three disks 216a, 216b and 216c connected by links 217. The first of these disks (216a) is attached to drive shaft 218 adapted to be driven by a jaw-rotating servo motor (not shown). The third of these disks (216c) is connected to the input shaft 215 such that the driving force of the jaw-rotating servo motor can be transmitted to the input shaft 215, as explained above with reference to FIGS. 2 and 3. As shown in FIGS. 12, mutually engaging gear wheels 219 are provided on the drive shafts 218 for the two rotary arm assemblies 211 such that the two rotary arm assemblies 211 rotate in opposite directions.

Each connecting shaft 213 rotatably supports one of the transverse seal jaws 221 through a sleeve 222. A sun gear 225 is affixed to a fixed shaft 226 penetrating the aforementioned supporting shaft 214, as better seen in FIG. 12, and a planet gear 223, having the same number of teeth as the sun gear 225, is unistructurally formed on one side of the sleeve 222. The sun gear 225 and the planet gear 223 are in motion-communicating relationship, both engaging with an idler gear 224.

Each of the squeezing members 227 is formed as three quarters of a rectangular frame with a squeezing rod 227b extending parallel to the connecting shaft 213 and two leg pieces 227a inserted into brackets 228 attached to the inwardly facing surfaces of the arm pieces 212 such that the squeezing rod 227b protrudes somewhat forward from the seal jaw 221. Coil springs 229 are provided as shown in FIGS. 14 for keeping the squeezing rod 227b in this forwardly protruding position.

The transverse seal jaws 221 are caused to move in a generally D-shaped trajectory, as explained above with reference to FIG. 5, by controllably moving the mobile outer and inner frames 230 and 234 in a pre-specified coordinated manner. In order to effect such a coordinated motion, a turnbuckle 338 is provided as shown in FIG. 12, supported rotatably by a frame body 245 and extending parallel to and between the left-hand and right-hand mobile frames 230 and 234. The right-hand and left-hand screw portions 238a and 238b of the turnbuckle 238 respectively engage the connector plates 231 and 235 for the mobile outer and inner frames 230 and 234 such that the two rotary arm assemblies 211 can be moved towards of away from each other by selectively rotating the turnbuckle 238 in the positive or negative direction. In FIG. 12, numeral 239 indicates a timing belt for communicating to the turnbuckle 238 the motive force of an axes-moving motor (not shown), which is a torque motor adapted to control its output torque according to the reaction forces from the mobile frames 230 and 234. Numeral 247 indicates a partition plate.

Figure 12:
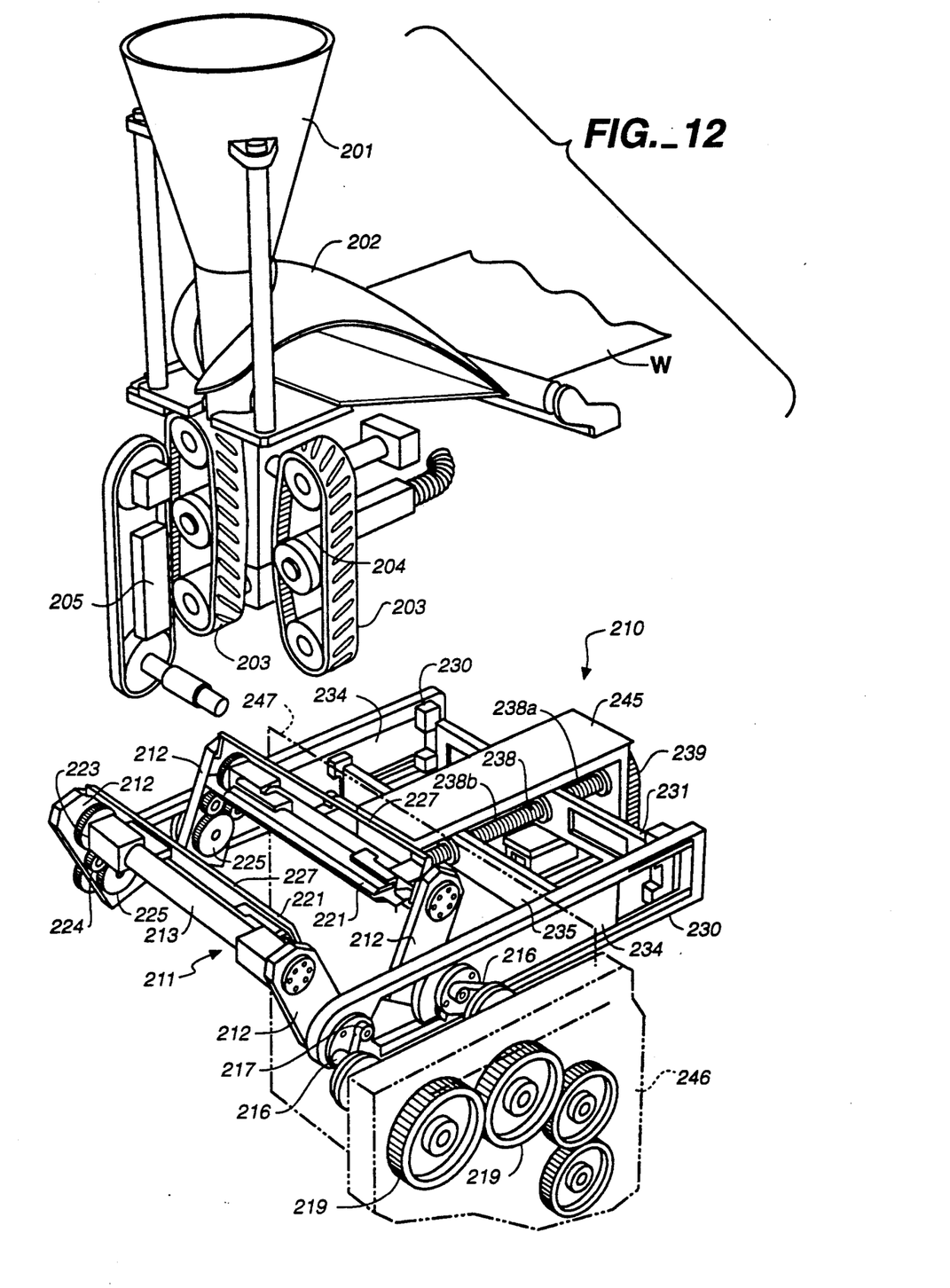
FIG. 12 is a schematic diagonal view of parts of another form-fill-seal packaging machine incorporating still another horizontal sealer embodying the present invention.

The control device for controlling the operations of the jaw-rotating and axes-moving motors independently or in a specified coordinated manner, such as those shown in FIGS. 6 and 8 is not shown in FIG. 12.

Figure 14A:
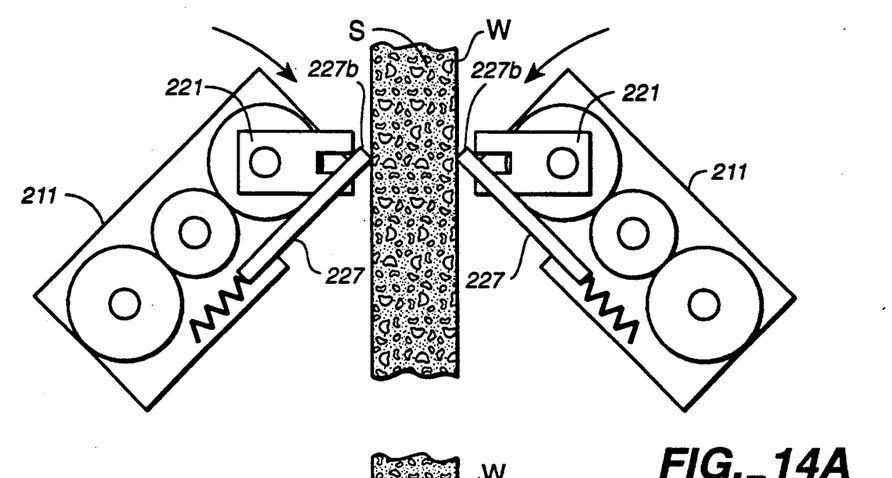
FIGS. 14A, 14B and 14C are schematic horizontal views for explaining the function of the squeezing members shown in FIGS. 12 and 13.
Figure 14B:
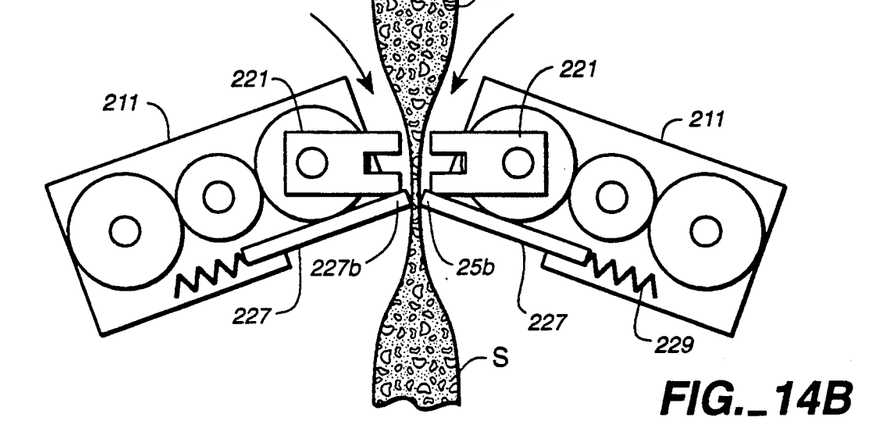
Figure 14C:
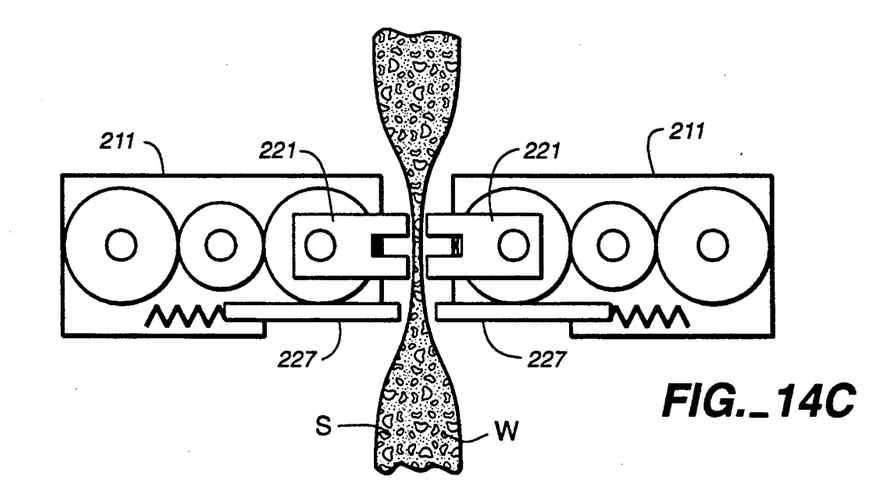

The operation of the embodiment shown in FIGS. 12, 13 and 14 is similar to that explained above with reference to FIG. 2, and hence will be explained only briefly. As the force of the jaw-rotating motor (not shown) is communicated through the Schmidt couplings 216, the rotary arm assemblies 211 are caused to rotate around the supporting shafts 215, but the seal jaws 221, unistructurally formed with the planet gears 223 engaging with the sun gears 225, remain facing each other in the direction of sealing the film material W. In the meantime, the turnbuckle 238 is rotated in synchronism with the rotary motion of the jaws 221 such that the jaws 221 can move in desired generally D-shaped trajectories. As the tubularly formed film material W is pulled down by the pull-down belts 203 such that its forward edge reaches the position shown in FIG. 14A, the squeezing rods 227b automatically come into contact with the film material W and begin to squeeze it therebetween until the position shown in FIG. 14B is reached. At this moment, the squeezing rods 227b moves downwardly past the jaws 221, pushing the contents S of the bag deeper downward. After the squeezing is done, when the position shown in FIG. 14C is reached, the seal jaws 221 press the film material W from both sides. Although the use of mobile outer and inner frames was disclosed above, other kinds of axes-moving means may be substituted such as a mechanism using cams or air cylinders.

It is to be recognized that many modifications and variations are possible on what has been disclosed above. For example, although the present invention has been described above in connection only with a form-fill-seal packaging machine of the vertical pillow type, the present invention is equally applicable to form-fill-seal packaging machines of the horizontal pillow type with only minor modifications. Horizontal pillow type packaging machines have been described, for example, in U.S. Pat. Nos. 4,506,488 and 4,512,136, and they are so called because an elongated bag-forming material is transported horizontally as it is sealed to make individual packages after it is filled with articles. A driving apparatus according to the present invention can be incorporated into such a horizontal pillow type packaging machine having sealing heaters extending vertically rather than horizontally. Thus, when such an apparatus is to be described, the equivalent of what was referred to above as the "horizontal heaters" in connection with a vertical pillow type packaging machine should rather be called "vertical heaters." Besides the novel mechanism according to the present invention for driving such "vertical heaters," horizontal pillow type packaging machines incorporating the present invention may be structured as described in these documents and hence will not be described in detail herein.

In summary, the specification is intended to be interpreted broadly, and any modifications and variations on the example described above, that may be apparent to a person skilled in the art, are intended to be within the scope of this invention.

What is claimed is:

1. A transverse sealer for a form-fill-seal packaging machine with means for transporting a bag-forming film material along a film path, comprising:

a pair of elongated heater assemblies;

a pair of heater-supporting members, each rotatably supported around one of a pair of axes which are adapted to remain parallel to each other and extending transverse to said film path, each of said heater assemblies being rotatably supported by one of said heater-supporting members such that said heater assemblies remain parallel to said axes and on opposite sides of said film path;

rotating means for causing said heater assemblies to rotate in mutually opposite directions, each around one of said axes, while keeping both of said heater assemblies extended parallel to said axes; and axes-moving means for changing the distance between said mutually parallel axes such that said heater assemblies can press each other over a portion of said film path with a finite length while rotating around said axes.

2. The transverse sealer of claim 1 wherein said heater assemblies each have a heating surface and said heater-supporting members each include an orienting mechanism which serves to cause said heating surface to remain oriented in a same direction as said heater assemblies are rotated around said axes.

3. The transverse sealer of claim 2 wherein said orienting mechanism includes a sun gear which is adapted to rotate with said heater-supporting member around one of said axes, an idler gear engaging with said sun gear, and a planet gear affixed to corresponding one of said heater assemblies and engaging with said idler, said planet gear having the same diameter as said sun gear.

4. The transverse sealer of claim 1 wherein said rotating means and said axes-moving means are in motion communicating relationship.

5. The transverse sealer of claim 4 wherein said rotating means include a cam and said axes-moving means include a cam follower which remains in contact with said cam.

6. The transverse sealer of claim 1 further comprising a control means for operating said rotating means and said axes-moving means in a mutually coordinated manner such that said heater assemblies move in specified trajectories.

7. The transverse sealer of claim 6 wherein said control means can control the operations of said rotating means and said axes-moving means such that said heater assemblies have a squeezing effect on a tubularly formed bag-forming material on said film path before a transverse sealing is effected thereon.

8. The transverse sealer of claim 6 wherein said axes-moving means include a pinion and a pair of rack gears engaging said pinion and each connected to one of said axes.

9. The transverse sealer of claim 6 wherein said axes-moving means include a turnbuckle and frames each supporting one of said axes, said frames being in engaged relationship with said turnbuckle such that the separation between said frames varies as said turnbuckle is rotated.

10. The transverse sealer of claim 9 wherein said turnbuckle has right-hand and left-hand screw parts where said frames engage said turnbuckle, said screw parts being so designed that said frames can be manually moved away from each other while remaining engaged with said turnbuckle.

11. The transverse sealer of claim 1 further comprising a pressure control means for controlling the pressure with which said pair of heater assemblies is pressed against each other while traveling on said portion of said film path.

12. The transverse sealer of claim 11 wherein said pressure control means include a turnbuckle and frames each supporting one of said axes, said frames being in engaged relationship with said turnbuckle such that the separation between said frames varies as said turnbuckle is rotated.

13. The transverse sealer of claim 12 wherein said turnbuckle has right-hand and left-hand screw parts where said frames engage said turnbuckle, said screw parts being so designed that said frames can be manually moved away from each other while remaining engaged with said turnbuckle.

14. The transverse sealer of claim 11 further comprising a pressure sensor on said heater supporting means for measuring said pressure between said heater assemblies.

15. The transverse sealer of claim 2 further comprising a pair of elongated film-squeezing members which are each affixed to one of said heater-supporting members and parallel to said axes such that said film-squeezing members can approach each other and squeeze a tubularly formed film material on said path as said heater assemblies are rotated by said rotating means.

16. The transverse sealer of claim 1 wherein said axes-moving means moves said mutually parallel axes substantially within a plane perpendicular to said film path.

17. The transverse sealer of claim 1 further comprising a pair of outer frames and a pair of inner frames, said outer frames being elongated and slidable in a direction perpendicular to both said film path and said axes, each of said inner frames being inside and slidably engaging with one of said outer frames, one of said heater-supporting members being rotatably supported by said outer frames and the other of said heater-supporting members being rotatably supported by said inner frames.

18. A method of transverse sealing for a form-fill-seal packaging machine with means for transporting a bag-forming film material along a film path, a pair of elongated heater assemblies and a pair of heater-supporting members each rotatably supported around one of a pair of axes which are adapted to remain parallel to each other and extending transverse to said film path, each of said heater assemblies being rotatably supported by one of said heater-supporting members such that said heater assemblies remain parallel to said axes and on opposite sides of said film path; said method comprising the steps of:
  causing said heater assemblies to rotate in mutually opposite directions, each around one of said axes, while keeping both of said heater assemblies extended parallel to said axes; and
  concurrently changing the distance between said mutually parallel axes such that said heater assemblies can press each other over a portion of said film path with a finite length while rotating around said axes.

19. The method of claim 18 wherein said step of changing the distance between said mutually parallel axes comprises moving said mutually parallel axes towards or away from each other.

20. The method of claim 18 further comprising the step of concurrently causing a tubularly formed film material on said path to be squeezed by moving a pair of elongated film-squeezing means towards each other from opposite sides of said film material.

* * * * *